(12) United States Patent
Van Rumpt (10) Patent No.: US 12,480,932 B2
(45) Date of Patent: Nov. 25, 2025

(54) SENSOR AND SYSTEM FOR MONITORING A SUBSTRATE

(71) Applicant: Growficient B.V., Eindhoven (NL)

(72) Inventor: Herman Wouter Van Rumpt, Eindhoven (NL)

(73) Assignee: GROWFICIENT B.V., Eindhoven (NL)

( * ) Notice: Subject to any disclaimer, the term of this patent is extended or adjusted under 35 U.S.C. 154(b) by 132 days.

(21) Appl. No.: 18/580,855

(22) PCT Filed: Jul. 21, 2022

(86) PCT No.: PCT/NL2022/050428
§ 371 (c)(1),
(2) Date: Jan. 19, 2024

(87) PCT Pub. No.: WO2023/003467
PCT Pub. Date: Jan. 26, 2023

(65) Prior Publication Data
US 2024/0369527 A1    Nov. 7, 2024

(30) Foreign Application Priority Data
Jul. 22, 2021  (NL) .................................... 2028809

(51) Int. Cl.
*G01N 33/34*   (2006.01)
*G01N 27/02*   (2006.01)
*G01N 33/24*   (2006.01)

(52) U.S. Cl.
CPC ......... *G01N 33/246* (2013.01); *G01N 27/028* (2013.01); *G01N 33/245* (2024.05)

(58) Field of Classification Search
CPC ... G01N 33/246; G01N 27/025; G01N 33/245
See application file for complete search history.

(56) References Cited

U.S. PATENT DOCUMENTS

2015/0223418 A1* 8/2015 Collins .................. A01G 9/024
47/62 R

FOREIGN PATENT DOCUMENTS

| CN | 104977329 | 10/2015 |
|---|---|---|
| JP | 2013200193 | 10/2013 |
| WO | 9924807 | 5/1999 |

\* cited by examiner

*Primary Examiner* — Alesa Allgood
(74) *Attorney, Agent, or Firm* — MH2 Technology Law Group, LLP (57) ABSTRACT

The present invention relates to a sensing system (10) for monitoring a substrate (1), comprising a sensing unit (4) with first and second sensing elements (3A, 3B) configured to be inserted into the substrate (1); a signal generation unit (5) configured to apply an electrical signal to the sensing elements; a readout unit (6) configured to determine at least one electrical parameter as a result of the electrical signal being applied to the sensing elements (3A, 3B); and a processing unit (7) configured to determine at least an amount of water inside the substrate (1) among an amount of water in the substrate (1) and a nutrient concentration in the substrate (1), based on the determined at least one electrical parameter and an electrical model of a combination of the sensing elements (3A, 3B) and the substrate (1) in which they are inserted, wherein the electrical model comprises a first inductor modelling a first inductance (Lp1) of the first sensing element (3A) and a second inductor modelling a second inductance (Lp2) of the second sensing element (3B); a capacitor modelling a capacitance (Cp) between the sensing elements (3A, 3B); a resistor modelling a conductance (Gp) between the sensing elements (3A, 3B); wherein the first inductance (Lp 1) is modelled as a known first function of the amount of water inside the substrate (1), wherein the second inductance (Lp2) is modelled as a known second function of the amount of water inside the (Continued)

substrate (1), wherein the capacitance (Cp) is modelled as a known third function of the amount of water inside the substrate (1), and wherein the conductance (Gp) is modelled as a known fourth function of the amount of water inside the substrate (1) and an amount of mobile ions representing the amount of nutrients inside the substrate (1).

20 Claims, 6 Drawing Sheets

SENSOR AND SYSTEM FOR MONITORING A SUBSTRATE

The present invention relates to a sensing system and a sensor for monitoring a substrate. More in particular, the present invention relates to measuring an amount of water in a substrate, and a concentration of nutrients in said water. The present invention is particularly useful for analysing substrates used in agriculture and/or horticulture.

For the cultivation of plants, substrates can be used to physically support the roots of a plant throughout their growth cycle. Mineral nutrients in an aqueous solution can be provided in the substrate such that the roots of the plant can absorb the various nutrients required for growth.

Various types of substrates for the purpose of cultivating plants are available. These substrates can typically be divided into soil-based substrates or soilless substrates. In either substrate, one or more parameters can be measured for monitoring plant growth. Two parameters are particularly important for monitoring the growth of a plant, namely the amount of water inside the substrate in which the plant is being cultivated, and the concentration of nutrients present in said water. For example, since the amount of water in the substrate itself may change over time, measuring the water content inside the substrate provides a useful insight for efficiently controlling plant growth. Additionally, the concentration of nutrients contained in the water inside the substrate should not be exceedingly high or exceedingly low for optimal plant growth. Therefore, monitoring the concentration of nutrients in the water inside the substrate is also beneficial for controlling plant growth.

The preferred range of the amount of water and concentration of nutrients in the substrate is dependent on the type of plant that is being cultivated, as well as the type of substrate used for growing the plant. Plant growth can be optimized for each individual type of plant and/or substrate by appropriately maintaining or controlling the desired water content and nutrient concentration in the substrate. Consequently, there is a need for accurately monitoring the amount of water and concentration of nutrients inside the substrate during plant growth.

Figure 1A:
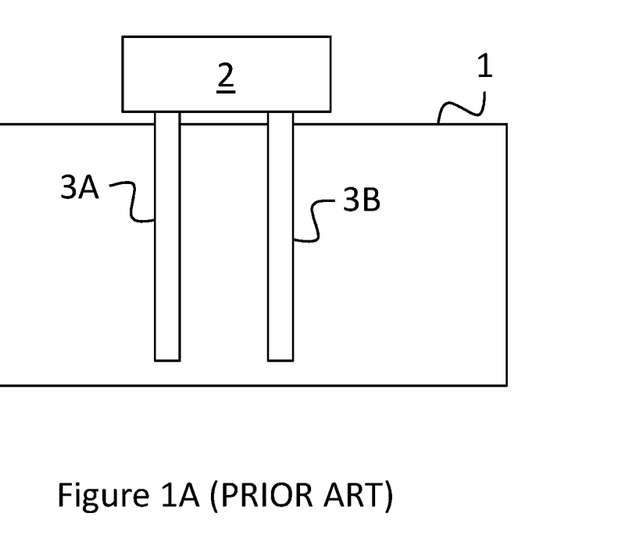
FIG. 1A is a cross-sectional view of a substrate and a sensing unit known in the art.

Hereinafter, a conventional measurement system known in the art is detailed with reference to FIGS. 1A and 1B. FIG. 1A illustrates a cross-sectional view of a substrate 1 and a sensing unit 2 having a first sensing element 3A and a second sensing element 3B that are inserted into substrate 1.

In the configuration shown in FIG. 1A, a part of substrate 1 between and around sensing elements 3A and 3B acts as a dielectric layer. As a result, sensing elements 3A and 3B, combined with the part of substrate 1 between said sensing elements 3A and 3B, form a capacitive element $C_p$. It is noted that the denotation '$C_p$' can be used to denote the capacitive element itself, or the corresponding capacitance value thereof. This also applies to other electrical components and their respective values, such as inductances L, resistors R and conductances G that will be described hereafter.

Capacitance $C_p$ is dependent on an area of sensing elements 3A and 3B, an effective distance between sensing elements 3A and 3B, and the effective permittivity, or dielectric constant, of the part of substrate 1 between sensing elements 3A and 3B which forms the dielectric layer. The effective dielectric constant of the part of substrate 1 in between sensing elements 3A and 3B is in turn dependent on the dielectric constant of substrate 1 itself and the dielectric constant of the water inside substrate 1. To this end, assuming that the distance and effective area are structurally fixed, then capacitance $C_p$ can be written as a multi-variable function $C_p(W, \varepsilon_s, \varepsilon_w)$, wherein W is the water content in substrate, $\varepsilon_s$ is the dielectric constant of substrate 1 without any water, and $\varepsilon_w$ is the dielectric constant of water.

The dielectric constant of water is typically substantially greater than the dielectric constant of substrates used for the cultivation of plants. As a result, the capacitance $C_p$ can be assumed to be concentrated in a part of substrate 1 in between sensing elements 3A and 3B in which water is present. Since the amount of water inside substrate 1 affects the value of capacitance $C_p$, this capacitance value can be considered indicative of the amount of water inside substrate 1.

Furthermore, in the configuration shown in FIG. 1A, due to a particular concentration of nutrients in the water inside substrate 1, which nutrients take the form of mobile ions, there exists a non-zero electrical conductivity (EC) between sensing elements 3A and 3B. This conductivity can be modelled as a conductance $G_p$ being formed in between sensing elements 3A and 3B, the value of said conductance $G_p$ being dependent on the distance between sensing elements 3A and 3B, an effective area of sensing elements 3A and 3B, and the amount of nutrients inside substrate 1. In turn, the amount of nutrients inside substrate 1 depends on the amount of water inside substrate 1 and the concentration of nutrients in said water. Therefore, the conductance $G_p$ can be written as a multi-variable function $G_p(W, n)$, wherein W is the water content, or amount of water, in substrate 1, and wherein n is the concentration of nutrients in the water inside substrate 1.

The effective dielectric constant of substrate 1 changes in dependence of the amount of water in substrate 1, which is reflected in a change in the capacitance $C_p$. In addition, a change in the water content in substrate 1 affects the value of the conductance $G_p$ between sensing elements 3A and 3B. Finally, a change in the concentration of nutrients in the water inside substrate 1 is reflected in a change in the conductance $G_p$.

Figure 1B:
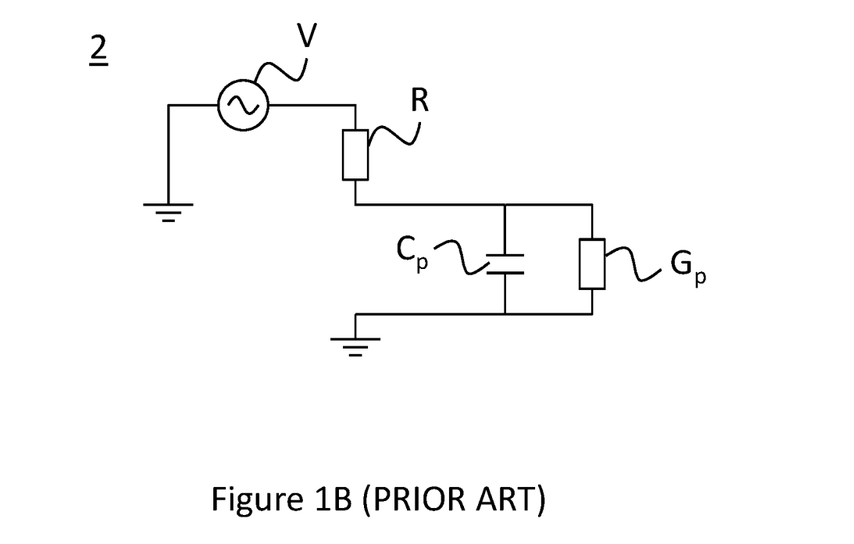
FIG. 1B is an electrical model of the sensing unit shown in FIG. 1A.

FIG. 1B shows a known schematic model of sensing unit 2 in combination with substrate 1 into which sensing elements 3A and 3B of sensing unit 2 are inserted. Under the assumption that substrate 1 contains a certain amount of water containing a particular concentration of nutrients, sensing elements 3A and 3B are electrically modelled as a parallel connection of a capacitance $C_p$ and conductance $G_p$ as shown in FIG. 1B using a capacitive element $C_p$ and a conductive element $G_p$.

Sensing unit 2 known in the art further includes an alternating current (AC) voltage source V connected to first sensing element 3A through a resistance R. Furthermore, second sensing element 3B is electrically connected to a ground potential.

In the measuring technique known in the art, the respective values of capacitance $C_p$ and conductance $G_p$ can be determined by measuring an amplitude and phase value associated with the voltage across resistance R as well as the voltage across the parallel connection of capacitance $C_p$ and conductance $G_p$. Using the known value of resistance R and the measured amplitudes and phases of the respective voltages, the value of capacitance $C_p$ and conductance $G_p$ can be calculated based on the impedance network shown in FIG. 1B. The amount of water in substrate 1 can then be derived from the calculated value of the capacitance $C_p$, and the nutrient concentration in substrate 1 can be derived from the calculated value of conductance $G_p$ in combination with the derived amount of water inside substrate 1.

The Applicant has found that the known measuring technique can be inaccurate for small values of $C_p$ and/or $G_p$.

It is an object of the present invention is to provide a high-accuracy sensing unit and sensing system for determining and/or monitoring plant growth in a substrate.

This object is achieved with the sensing system according to claim 1, which comprises a sensing unit having a first and second sensing element configured to be inserted into the substrate, and a signal generation unit for applying an electrical signal to the first and second sensing elements. The system further comprises a readout unit for determining at least one electrical parameter as a result of the electrical signal being applied to the first and second sensing elements. The sensing system also comprises a processing unit configured to determine at least an amount of water inside the substrate among an amount of water in the substrate and a nutrient concentration in the substrate, based on the determined at least one electrical parameter and an electrical model of a combination of the first and second sensing element and the substrate in which they are inserted.

According to the invention, the electrical model comprises a first inductor modelling a first inductance of the first sensing element and a second inductor modelling a second inductance of the second sensing element, a capacitor modelling a capacitance between the first and second sensing elements, and a resistor modelling a conductance between the first and second sensing elements.

The first inductance is modelled as a known first function of the amount of water inside the substrate, the second inductance as a known second function of the amount of water inside the substrate, the capacitance as a known third function of the amount of water inside the substrate, and the conductance as a known fourth function of the amount of water inside the substrate and a concentration of mobile ions representing the concentration of nutrients inside the substrate.

A problem with the known measuring technique of FIG. 1B is that an inductance value $L_p$ associated with various elements of sensing unit 2, in particular that of sensing elements 3A and 3B, is not taken into account. However, depending on the frequency of the applied signal, the presence of such inductance $L_p$ can have a substantial impact on the measurement. For example, at higher frequencies, inductance $L_p$ becomes increasingly prominent and can therefore significantly influence the measured amplitudes and phases, thereby being detrimental to the measurement accuracy. Nevertheless, a high-frequency signal is typically required such that the value of capacitance $C_p$ can be determined with sufficient accuracy. Simply reducing the signal frequency therefore does reduce the effect of inductance $L_p$, but is at the same time detrimental for determining the value of capacitance $C_p$.

Furthermore, the thickness of substrate 1 that is monitored by sensing unit 2 is another factor that determines the influence of inductance $L_p$ on the overall measurement. For example, a thicker substrate generally requires longer sensing elements 3A and 3B to appropriately measure the amount of water and nutrient concentration inside said substrate. Consequently, the inductance value associated with such longer sensing elements 3A and 3B increases, thereby also increasing the effect of such inductance $L_p$ on the measurement accuracy for thicker substrates.

Figure 2A:
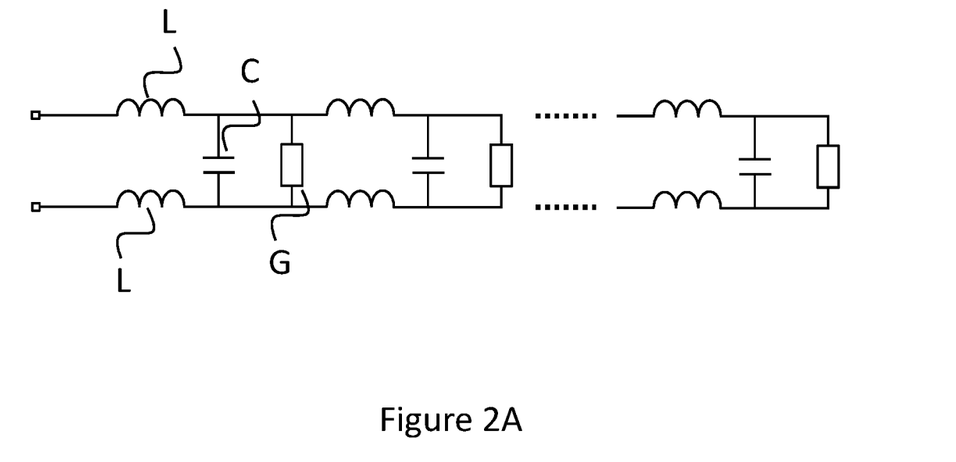
FIG. 2A is an electrical model of sensing elements and substrate as a distributed RLC network.

Based on the above, instead of the network shown in FIG. 1B, the impedance formed by sensing elements 3A and 3B and substrate 1 is more accurately modelled as a distributed RLC network, such as the electrical model shown in FIG. 2A. In this figure, sensing elements 3A and 3B are divided into a plurality of segments, each segment comprising an inductive element L, a capacitive element C, and a conductive element G, that each describe the properties of that segment. The Applicant has found that the electrical model shown in FIG. 2A can be simplified or approximated by the electrical model shown in FIG. 2B. In this model, two inductances $L_{p1}$ and $L_{p2}$ are included in the electrical model, which inductances model an inductance value of sensing elements 3A and 3B, respectively. In addition, a capacitance $C_p$ and a conductance $G_p$ is included in the electrical model, which capacitance and conductance respectively models a capacitance value and conductance value of sensing elements 3A and 3B in combination with substrate 1.

Figure 2B:
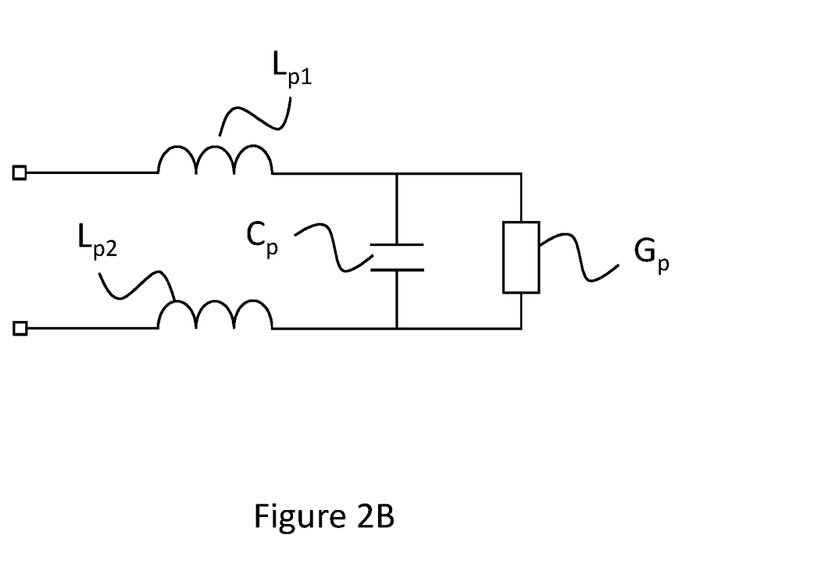
FIG. 2B is a simplified model of the electrical model shown in FIG. 2A.

By comparing the configuration of FIG. 2B to the measurement technique shown in FIG. 1B, it can readily be seen that the inductances $L_{p1}$ and $L_{p2}$ affect the amplitude behaviour as well as the phase behaviour of the shown electrical model of sensing elements 3A and 3B. In particular, the circuit shown in FIG. 2B will exhibit a higher-order phase response, rather than the first-order behaviour as would be expected from the model shown in FIG. 1B. Consequently, if not accounted for, the inductances $L_{p1}$, $L_{p2}$ associated with sensing elements 3A and 3B are detrimental to the measurement accuracy, as well as a measurement range across which a reliable measurement can be performed.

The sensing system according to the present invention is able to take into account not just the modelled capacitance and conductance between the sensing elements, but also the inductance of the sensing elements. By taking into account the first and second inductance corresponding to the first and second the sensing element, the amount of water and nutrient concentration inside the substrate are determined more accurately.

The processing unit may be configured to find a unique solution to a system of equations. The system of equations may comprise a first equation, a second equation, and a third equation. The first equation may express the capacitance as a function of the first inductance and/or second inductance or vice versa, and the second equation and the third equation may each describe a relationship between one or more electrical parameters among the at least one electrical parameter, and the first inductance, the second inductance, the capacitance, and/or the conductance.

The processing unit may be further configured to determine, using the unique solution, the amount of water inside the substrate based on the determined value of capacitance $C_p$ and the third function, and/or the determined value of the first and/or second inductance $L_{p1}$, $L_{p2}$ and the first and/or second function, respectively. The processing unit may be optionally further configured to determine, using the unique solution, the nutrient concentration in the substrate based on the determined amount of water inside the substrate, the determined value of conductance $G_p$, and the fourth function.

For example, the second equation may describe a relationship between an electrical parameter and $G_p$, and the third equation may describe a relationship between a same or another electrical parameter and $L_{p1}$, $L_{p2}$ and/or $C_p$. In another example, each of the second and third equation describe a relationship between one or more electrical parameters and each of $L_{p1}$, $L_{p2}$, $C_p$ and $G_p$. In yet another example, each of the second and third equation describes a relationship between one or more electrical parameters, $C_p$ and $G_p$.

Each of the first and second function may additionally be function of a density factor of the substrate, wherein the density factor is a substrate-dependent parameter that represents a distribution of the amount of water in said substrate. Furthermore, the third function may additionally be a function of a dielectric constant of water and a dielectric constant of the substrate.

In some embodiments, the dielectric constant of the substrate and the density factor of the substrate may be known or predetermined. For example, the density factor of the substrate could be determined using physically based modelling techniques. In other embodiments, at least one of the dielectric constant of the substrate and the density factor of the substrate may not be known or predetermined, and may instead be determined using a calibration process comprising one or more calibration measurements.

For each calibration measurement, a known amount of water having a known nutrient concentration may be provided in the substrate. The signal generation unit may be configured to apply an electrical calibration signal to the first and second sensing element, and the readout unit may be configured to determine at least one electrical calibration parameter as a result of the electrical calibration signal being applied to the first and second sensing element. The processing unit may be configured to determine at least one of the dielectric constant of the substrate and the density factor of the substrate, based on the determined at least one electrical calibration parameter and the electrical model of the combination of the first and second sensing element and the substrate in which they are inserted.

Here, it is noted that the at least one electrical calibration parameter that is/are determined during calibration may be identical to the at least one electrical parameter that is/are determined during normal operation.

The processing unit may be configured to find a unique solution to a system of equations. The system of equations may comprise the first equation, a fourth equation, and a fifth equation. The fourth equation and the fifth equation may each describe a relationship between one or more electrical calibration parameters among the at least one electrical calibration parameter, and the first inductance, the second inductance, the capacitance, and/or the conductance. The processing unit may be further configured to determine the density factor of the substrate based on the determined value of the first inductance and/or the second inductance, and the first and/or second function, respectively. Additionally or alternatively, the processing unit may be configured to determine the dielectric constant of the substrate based on the determined value of the capacitance, and the third function.

Through the calibration process, the density factor and/or the dielectric constant of the substrate can be determined to enable determining the amount of water and nutrient concentration inside the substrate more accurately. For example, by taking into account a value of first and second inductances $L_{p1}$ and $L_{p2}$ in dependence of the amount of water inside the substrate, a more accurate measurement result of the amount of water and nutrient concentration inside the substrate can be acquired by the sensing system.

The calibration process may comprise a plurality of calibration measurements for different amounts of water in the substrate. The processing unit may be further configured to determine the dielectric constant of the substrate by matching the third function, using the dielectric constant of the substrate as a parameter, to a plurality of capacitance values corresponding to the plurality of calibration measurements. Additionally or alternatively, the processing unit may be further configured to determine the density factor of the substrate by matching the first and/or second function, using the density factor of the substrate as a parameter, to the plurality of first inductance values and/or second inductance values, respectively, corresponding to the plurality of calibration measurements.

For example, the first and/or second function may be matched to the results of the calibration measurements by curve fitting, using the density factor as a parameter, the first and/or second function to a curve formed by the plurality of first and/or second inductance values, respectively, such that the modelled first and second functions match the results from the calibration measurements.

The signal generation unit may comprise a transistor pair, wherein a gate or base terminal of each transistor in said transistor pair is electrically coupled to a drain or collector terminal of the other transistor in said transistor pair. The signal generation unit may further comprise a resonant tank comprising a tank inductor and a tank capacitor that are coupled in parallel and electrically connected in between the drain or collector terminals of the transistor pair, and a current source connected to a source or emitter terminal of each transistor. In operation, the signal generation unit may be configured to generate a voltage signal at the drain or collector terminals of the transistors, the voltage signal having an oscillation frequency and an oscillation amplitude.

The second equation may describe the oscillation amplitude as a function of a resistive part of a combined impedance of the resonant tank and the electrical model, and the current generated by the current source, wherein the current is either known or measured. The at least one electrical parameter and/or the at least one electrical calibration parameter may comprise the oscillation amplitude. Additionally or alternatively, the third equation may describe that a reactive part of the combined impedance of the resonant tank and the electrical model is equal to zero. More in particular, the third equation may be a condition for $L_{p1}$, $L_{p2}$, $C_p$, $G_p$, $C_t$, and/or $L_t$, such that the reactive part of the combined impedance is equal to zero.

The processing unit may be configured to control a value of the tank inductor and/or the tank capacitor such that the oscillation frequency of the voltage signal becomes equal to a predefined signal frequency. Furthermore, an electrical parameter and/or electrical calibration parameter among the at least one electrical parameter and/or at least one electrical calibration parameter may comprise the controlled value of the tank inductor and/or the tank capacitor. For example, the value of the tank inductor and/or the value of the tank capacitor may be controlled based on a comparison between the oscillation frequency of the voltage signal, and an oscillation frequency of a reference signal, this latter oscillation frequency being substantially identical to the predefined signal frequency. Alternatively, instead of controlling the oscillation frequency, one of the at least one electrical parameter and/or at least one electrical calibration parameter may comprise the oscillation frequency of the voltage signal.

The oscillation frequency of the voltage signal may lie in a range of 1-500 MHZ, preferably in a range of 5-50 MHz.

The value of the first inductor may be substantially equal to the value of the second inductor, for example because the first and second sensing elements are identical.

The sensing system may further comprise a temperature sensor configured to determine a temperature inside or near the substrate. Furthermore, the processing unit may be configured to receive the determined temperature from the temperature sensor and to determine the dielectric constant of water based on the determined temperature, and to modify the third function in accordance with the determined dielectric constant of water.

The temperature sensor may be comprised in the sensing unit, preferably in, at or near one of the first and second sensing element. Additionally or alternatively, the readout unit may be comprised in the sensing unit. Additionally or alternatively, the processing unit may be comprised in the sensing unit.

The sensing system may comprise a plurality of said sensing units for monitoring a plurality of respective substrates. Thus, a system is obtained which can monitor a multitude of substrates simultaneously using a plurality of sensing units, such as in a greenhouse comprising a plurality of substrates.

According to another aspect of the present invention, a sensing unit as defined above is provided.

Next, the present invention will be described with reference to the appended drawings, wherein.

Hereinafter, reference will be made to the appended drawings. It should be noted that identical reference signs may be used to refer to identical or similar components.

Figure 3:
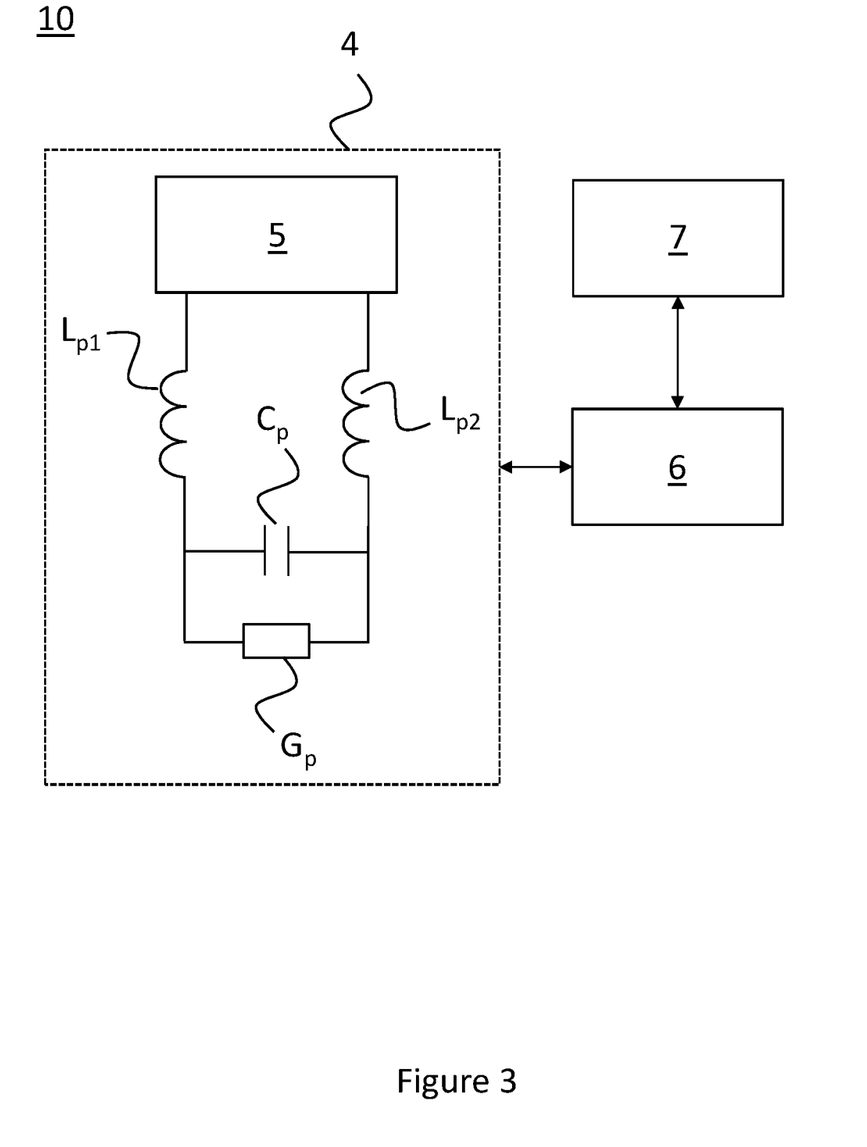
FIG. 3 is a sensing system according to an embodiment of the present invention.

FIG. 3 illustrates a sensing system 10 according to an embodiment of the present invention, which is configured to determine an amount of water and a nutrient concentration present in substrate 1. Sensing system 10 comprises a sensing unit 4 comprising first and second sensing element 3A and 3B, and a signal generation unit 5. Sensing elements 3A and 3B are electrically modelled as an impedance network comprising inductances $L_{p1}$ and $L_{p2}$ of the first and second sensing element 3A and 3B, a capacitance $C_p$ in between the first and second sensing element 3A and 3B, and a conductance $G_p$ in between the first and second sensing element 3A and 3B. Each of inductances $L_{p1}$ and $L_{p2}$, capacitance $C_p$ and conductance $G_p$ is modelled as a function of the amount of water inside substrate 1. In addition, conductance $G_p$ is modelled as a function of the nutrient concentration and the amount of water inside substrate 1. As stated above, there is a correlation between the nutrient concentration and the concentration of mobile ions in the water inside substrate 1.

In the electrical model shown in FIG. 3, three unknowns exist, namely capacitance $C_p$, conductance $G_p$ and inductances $L_{p1}$ and $L_{p2}$. As stated before, capacitance $C_p$ may depend on the water content inside substrate 1, and conductance $G_p$ may depend on the water content as well as the nutrient concentration in substrate 1. In other words, if at least the capacitance $C_p$ and the conductance $G_p$ can be determined, then the amount of water and the nutrient concentration in substrate 1 can be derived based on the determined values of $C_p$ and $G_p$.

Hereinafter, the denotation '$L_p$' may be used to denote either of inductances $L_{p1}$ and $L_{p2}$. More in particular, in some embodiments, $L_{p1}$ and $L_{p2}$ may be substantially identical to each other, as a consequence of first sensing element 3A being substantially identical to second sensing element 3B.

A total inductance $L_{max}$ which is associated with the full length of each of first and second sensing element 3A and 3B is modelled as a function of the length as well as the cross-sectional area of said sensing elements. Since these parameters are not influenced by substrate conditions, such as water content or nutrients, the total inductance $L_{max}$ corresponding to one of first and second sensing elements 3A and 3B will be constant. However, due to changing conditions in substrate 1, the effective inductance, that is, each of the inductances $L_{p1}$ and $L_{p2}$ included in the electrical model, is generally not equal to the corresponding total inductance value $L_{max}$. More in particular, both the amount of water inside substrate 1 as well as the distribution of said water in substrate 1 affect an effective or average 'position' of the capacitance $C_p$ and conductance $G_p$ along the length of sensing element 3A and 3B, thereby also affecting the inductances $L_{p1}$ and $L_{p2}$. Consequently, the effective value of each inductance $L_{p1}$ and $L_{p2}$ in the electrical model does not have a constant value, but rather it is dependent on the water content in substrate 1. The dependence of the effective inductance on the water inside substrate 1 is further detailed with reference to FIGS. 4A and 4B, which show two exemplary cases of water content distribution inside substrate 1.

Figure 4A:
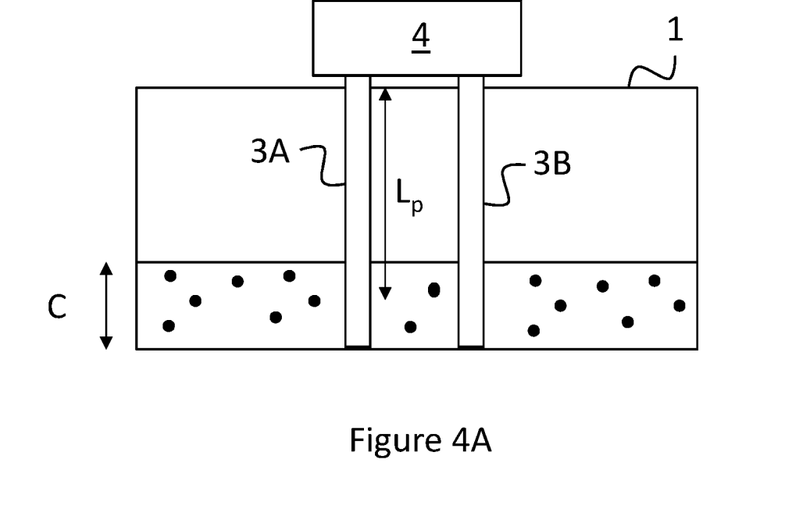
FIGS. 4A and 4B illustrate the relation between water content in a substrate and an effective inductance of the sensing elements of the sensing unit.
Figure 4B:
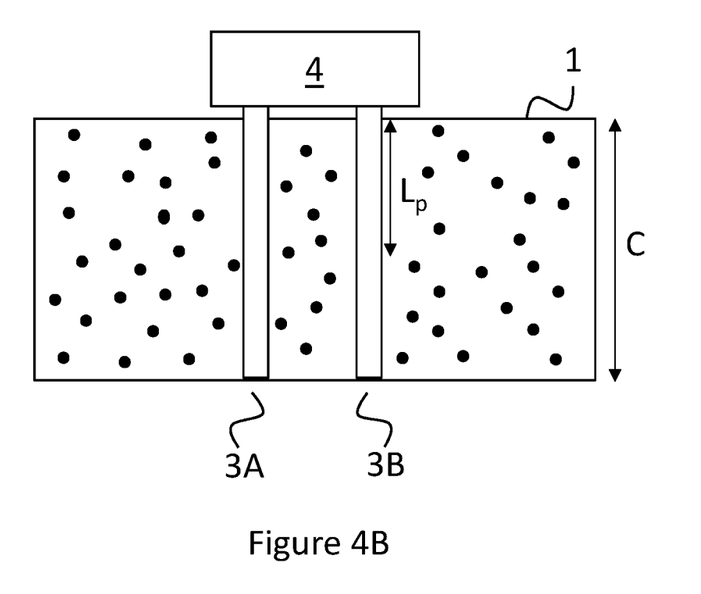

FIG. 4A illustrates an example situation in which the water content in substrate 1 is concentrated in a region indicated by the letter C. More in particular, FIG. 4A illustrates an example in which substrate 1 is fully saturated with water in a bottom region whereas an upper region is not filled with water at all. FIG. 4B illustrates a different example in which the water content is uniformly distributed in substrate 1 although substrate 1 may not be fully saturated.

The modelled capacitance $C_p$ and conductance $G_p$ will be predominantly concentrated in a region of substrate 1 between sensing elements 3A and 3B that contains water and nutrients, respectively. As can be seen from FIG. 4A, the effective length of sensing elements 3A and 3B, and therefore also the effective inductance $L_{p1}$ and $L_{p2}$ thereof, will vary in dependence of C. On the other hand, in FIG. 4B, the effective length of sensing elements 3A and 3B, and therefore also the effective inductance $L_{p1}$ and $L_{p2}$ thereof, will not vary in dependence of C.

Figure 4C:
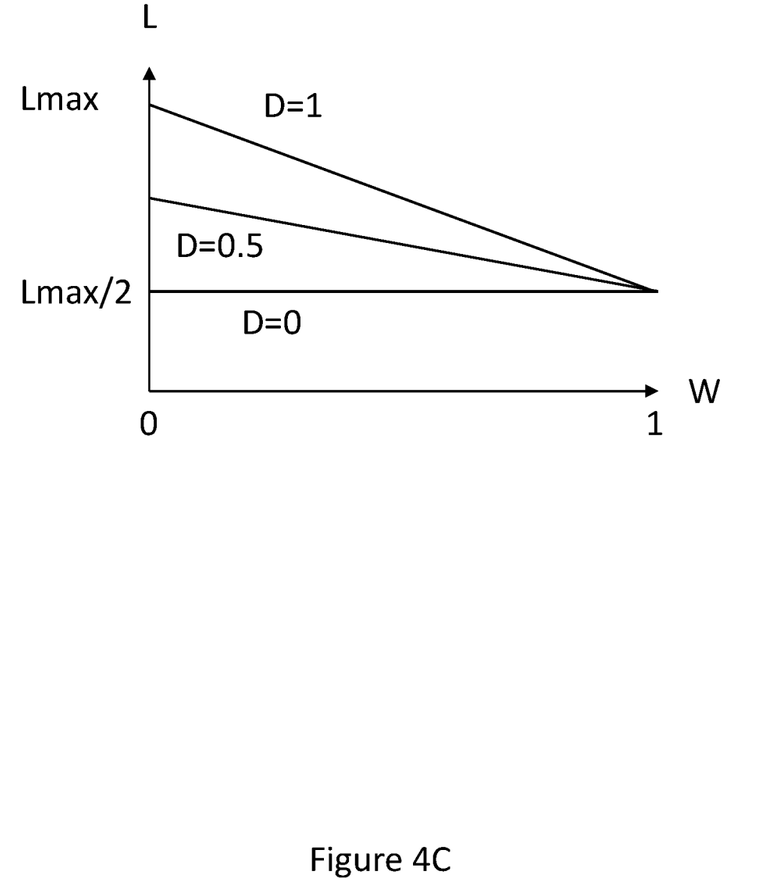
FIG. 4C illustrates the relation between inductance of the sensing elements and the water content.

The Applicant has determined that the behaviour of $L_{p1}$ and $L_{p2}$ varies between the extremes shown in FIGS. 4A, 4B. Furthermore, the Applicant has found that most substrates can be described using a linear relationship between the amount of water and inductance. This linear relationship is illustrated in FIG. 4C. The upper curve, denoted by D=1, illustrates the example of FIG. 4B, whereas the lower curve, denoted by D=0, illustrates the example of FIG. 4B. In FIG. 4C, W denotes the water content as ranging from 0, i.e. no water, to 1, i.e. substrate 1 being fully saturated. The factor D, which is the density factor, describes how the inductance, e.g. $L_{p1}$ and $L_{p2}$, depends on the water content.

$$L_p = \frac{L_{max}}{2} * (I + D * [I - W])$$

In other words, similarly to the capacitance $C_p$ and the conductance $G_p$, under the assumption that the maximum inductance of sensing elements 3A and 3B is constant, the inductance $L_p$ corresponding to a respective sensing element can be modelled as a multi-variable function $L_p$ (W, D), which is a function of water content W and density factor D. By appropriately selecting the density factor D based on a respective substrate type, the correct relation between water content W inside substrate 1 and the effective inductance $L_p$ of each of $L_{p1}$ and $L_{p2}$ can be accurately determined.

Various types of substrates can be used for growing plants. In particular, different types of plants may require different substrate types, or may show improved growth efficiency in specific substrates. It is found that the density factor D of a respective substrate depends on the type of substrate used. For example, rock wool will exhibit a water content distribution similar to that shown in FIG. 4A, wherein the water is substantially concentrated at a bottom of substrate 1. On the other hand, if, for example, sand is used as a substrate, then the water content may become substantially homogeneously distributed, such as shown in FIG. 4B. Other, non-limitative examples of substrate materials include polyurethane, polyphenol or cocos. Each type of substrate may have a respective density factor representing the water content distribution in said substrate.

Furthermore, as previously mentioned, the type of substrate also affects the value of the capacitance $C_p$, as the capacitance $C_p$ is dependent on the dielectric constant of the substrate. Therefore, both the capacitance $C_p$ and the inductance $L_p$ are a function of substrate-specific parameters which must be taken into account in order to eventually accurately determine the water content and the nutrients concentration.

Each of the capacitance $C_p(W, \varepsilon_s, \varepsilon_w)$, the conductance $G_p$ (W, n) and the inductance $L_p$ (W, D) is a multi-variable function of at least one of water content W, nutrient concentration n, dielectric constant $\varepsilon_s$ of substrate 1, and dielectric constant $\varepsilon_w$ of water. However, provided that D, $\varepsilon_s$, and $\varepsilon_w$ are known, inductances $L_{p1}$ and $L_{p2}$ can each be expressed in terms of the capacitance $C_p$, or vice versa. Consequently, as previously stated, if the values of $C_p$ and $G_p$ can be determined, then the amount of water W and nutrient concentration n can be determined from $C_p(W, \varepsilon_s, \varepsilon_w)$ and $G_p$ (W, n) by solving the functions of $C_p$ and $G_p$ for W and n, and determining W and n based on the determined values of $C_p$ and $G_p$.

Once again referring to FIG. 3, in order to determine the amount of water and the nutrient concentration, $L_p$, $C_p$ and $G_p$ must be determined. Assuming density factor D and dielectric constant $\varepsilon_s$ of substrate 1 are known, the value for $L_p$, $C_p$ and $G_p$ can be determined based on a system of equations that comprises equations that express the value of $L_p$, $C_p$ and $G_p$ in relation to known or measurable parameters. A first equation is obtained by expressing capacitance $C_p$ as a function of first or second inductance $L_{p1}$ and $L_{p2}$. Only two additional equations are required to complete the system of equations and to obtain a unique solution corresponding to the values of $L_p$, $C_p$ and $G_p$.

To this end, in the embodiment shown in FIG. 3, sensing unit 4 comprises a signal generation unit 5 which is configured to apply an electrical signal to the first and second sensing elements 3A and 3B. Sensing system 10 further comprises a readout unit 6 that is configured to determine at least one electrical parameter of the sensing unit 4 as a result of the electrical signal being applied to the first and second sensing elements 3A and 3B. Sensing system 10 further comprises a processing unit 7 that is configured to determine at least an amount of water inside the substrate among the amount of water in the substrate and the nutrient concentration, but preferably both, based on the determined at least one electrical parameter and the electrical model comprising $L_{p1}$, $L_{p2}$, $C_p$ and $G_p$. In some embodiments, processing unit 7 determines the value of capacitance $C_p$ and conductance $G_p$ from a unique solution to a system of equations. In particular, the determined at least one electrical parameter can be selected such that in each equation comprised in the system of equations, the only unknowns are the value of $L_{p1}$, $L_{p2}$, $C_p$ and/or $G_p$. Consequently, by solving the system of equations, the value of $C_p$ and $G_p$ can be determined. In turn, processing unit 7 can determine the amount of water and nutrient concentration using the functions $C_p(W, \varepsilon_s, \varepsilon_w)$ and $G_p$ (W, n) and the determined values thereof.

Therefore, in order to determine the amount of water and nutrient concentration inside substrate 1, the functions $L_p$ (W, D), $C_p(W, \varepsilon_s, \varepsilon_w)$ and $G_p$ (W, n) must either be known or determined. Several options are available for determining these functions, which are detailed below.

One option to determine the functions for $L_p$, $C_p$ and $G_p$ is to use physical modelling. Using a physical model, a value for $C_p$ and $G_p$ can directly be calculated for a given amount of water and nutrients, respectively. By inverting these relationships, the amount of water and/or the nutrient concentration can be determined for given determined $C_p$ and $G_p$, respectively.

Another option is to compare determined values of $C_p$ and $G_p$ to reference values and determine the amount of water and nutrient concentration inside substrate 1 based on a known dependency of these values. For example, if a value $G_{p0}$ is measured for a substrate that has a known nutrient concentration no, and if it is assumed that $G_p$ is proportional to the amount of nutrients, then the amount of nutrients n corresponding to a determined conductance $G_{p1}$ can be determined using $n_1 = n_0 \times G_{p1}/G_{p0}$.

Yet another option is to perform a measurement sweep of $C_p$ and/or $G_p$ for a given substrate using different amounts of water and/or nutrient concentrations. This would provide a look-up table with which the amount of water and/or nutrient concentration can be determined based on the swept values of $C_p$ and/or $G_p$.

Regardless of which method is used to determine the amount of water and/or nutrient concentration, the values of $L_p$ (e.g., $L_{p1}$ and $L_{p2}$), $C_p$ and $G_p$ need to be determined. These values can be determined using the approach detailed above.

In FIG. 3, processing unit 7 is shown to be external to sensing unit 4. However, the present invention is not limited thereto. For example, processing unit 7 and readout unit 6 may be incorporated in sensing unit 4. In that case, sensing unit 4 applies the electrical signal, determines the at least one electrical parameter, and determines the amount of water W and nutrient concentration n based on the determined at least one electrical parameter and the electrical model of sensing elements 3A and 3B. Although not shown in the figures, sensing unit 4 may further comprise a display, or the like, on which the determined amount of water and nutrient concentration inside the substrate is shown. Additionally, readout unit 6 may be incorporated in sensing unit 4 and sensing unit 4 may transmit, using a communication module comprised therein, measurement values to processing unit 7, for example wirelessly.

In practice, a greenhouse may comprise a plurality of various types of substrates. To this end, sensing system 10 may comprise a plurality of said sensing units 4 to monitor the water content and amount of nutrients in each respective substrate in which one or more plants are grown. The system may comprise an external device, such as a terminal device, which is configured to collect and store a water content value and a nutrient concentration corresponding to each of the plurality of sensing units 4 in sensing system 10. A user can then access the stored values of the amount of water and/or the nutrient concentrations in a respective substrate. In such system, a central processing unit 7 can be used that processes the measurement values for all sensing units 4. Preferably, a readout unit 6 is included in each sensing unit 4.

As previously discussed, both the density factor D and the dielectric constant $\varepsilon_s$ of a substrate may depend on the type of substrate that is being monitored. In some cases, the value of these parameters may be known or can be found beforehand, such they can be used to calculate the amount of water and/or the amount of nutrients based on the known or predetermined functions of $L_p$, Cp, and/or $G_p$. However, in other cases, these parameters are unknown. For example, a manufacturer of the substrate may not have determined both the substrate dielectric constant and the density factor during or after manufacturing, and thus cannot provide an accurate value of one or both of said parameters.

In order to determine the density factor and/or the substrate dielectric constant, a calibration process can be used to determine the density factor and dielectric constant corresponding to a particular substrate. The calibration comprises one or more calibration measurements, wherein, for each calibration measurement, a known amount of water containing a known nutrient concentration is provided in the substrate. The remainder of the calibration measurement is similar to the process of determining the amount of water and nutrient concentration. More in particular, signal generation unit 5 applies an electrical calibration signal to first and second sensing elements 3A and 3B, after which readout unit 6 determines at least one electrical calibration parameter as a result of the electrical calibration signal being applied to the first and second sensing element 3A and 3B.

Then, processing unit 7 determines, based on the known amount of water and the known nutrient concentration, at least one of the dielectric constant $\varepsilon_s$ of substrate 1 and density factor D of substrate 1 based on the determined at least one electrical calibration parameter and the electrical model of the combination of the first and second sensing element 3A and 3B and the substrate 1 in which they are inserted. Processing unit 7 may determine these parameters using the same system of equations as described before to determine a value of inductances $L_{p1}$ and $L_{p2}$, capacitance $C_p$ and conductance $G_p$, such that, based on these determined values for $L_p$, $C_p$ and $G_p$, the density factor D and the substrate dielectric constant $\varepsilon_s$ can be determined. For example, the result of each of the one or more calibration measurements can be used to match functions $L_p$ (W, D), $C_p(W, \varepsilon_s, \varepsilon_w)$ and $G_p$ (W, n) to the determined values thereof in the one or more calibration measurements. For example, density factor D and the substrate dielectric constant $\varepsilon_s$ can be modified such that these functions overlap with the results of the one or more calibration measurements. If only the density factor D or only the substrate dielectric constant $\varepsilon_s$ is unknown, then only a part of the calibration process is required.

It is noted that, since the density factor and the dielectric constant are dependent on the type of substrate, if one or both parameters are unknown for the respective substrate, a calibration procedure may be necessary only once to characterize said substrate. In other words, the density factor and/or dielectric constant corresponding to a particular substrate that are determined from the calibration process may be stored in a memory such that another substrate of the same type can use the calibration result from a previously performed calibration in order to calculate the amount of water and nutrient concentration for the respective substrate.

In the above, it was assumed that the dielectric constant of water $\varepsilon_w$ is known. However, it is noted that the dielectric constant of water is temperature dependent in practice. As a result, the capacitance $C_p$ will also be temperature dependent to some extent. In some cases, it is sufficient to assume room temperature, or to determine an ambient temperature in a direct environment of substrate 1. However, in other cases, the temperature inside substrate 1 can differ more significantly from the ambient temperature, thereby deteriorating the measurement accuracy if the ambient temperature is used for determining the dielectric constant of water. To this end, in some embodiments, sensing unit 4 further comprises a temperature sensor arranged inside at least one of sensing elements 3A and 3B that measures the temperature inside substrate 1. For example, the temperature sensor may be arranged at one end of at least one of sensing elements 3A and 3B, which end is inserted into substrate 1. The temperature sensor is configured to determine a temperature inside substrate 1, and to provide this temperature to readout unit 5 or processing unit 7. The measured temperature can then be used to determine the dielectric constant of water prior to calculating the amount of water and amount of nutrients inside substrate 1.

Figure 5:
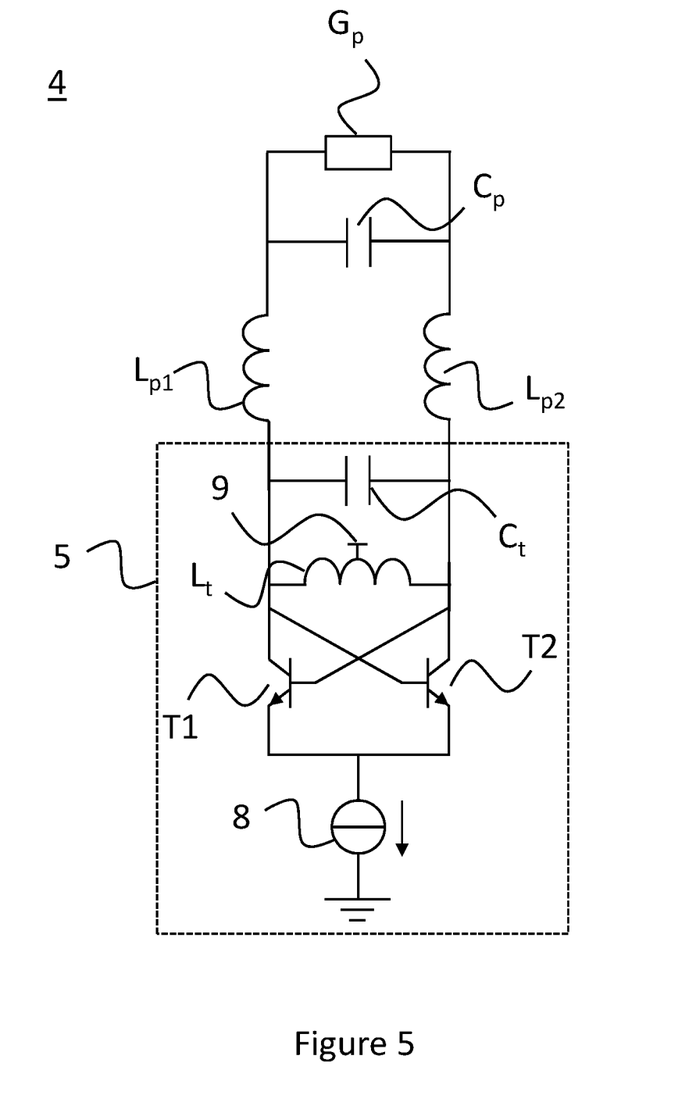
FIG. 5 is a sensing unit according to an embodiment of the present invention.

FIG. 5 illustrates a sensing unit 4 according to an exemplary embodiment of the present invention. Similarly to sensing unit 4 as shown in FIG. 3, sensing elements 3A and 3B in combination with substrate 1 are electrically modelled with first and second inductance $L_{p1}$ and $L_{p2}$, a capacitance $C_p$ and a conductance $G_p$.

In the embodiment shown in FIG. 5, signal generation unit 5 comprises a negative-resistance oscillator, also referred to as a cross-coupled oscillator or resonant tank oscillator, which is electrically connected to sensing elements 3A and 3B. In this embodiment, a resonance tank, formed by $C_t$ and $L_t$, in combination with $C_p$, $G_p$ and $L_p$, is electrically coupled to a source of negative resistance. This latter source is formed by a cross-coupled transistor pair T1 and T2. For example, each of the transistors T1 and T2 in the transistor pair is a bipolar junction transistor (BJT) or field effect transistors (FET). Transistors T1 and T2 are cross-coupled by electrically coupling a base (or gate) terminal of each of said transistors to a collector (or drain) terminal of the other of said transistors. The emitter (or source) terminal of both transistors is connected to a current source 8. Furthermore, at point 9, a positive voltage $V_{cc}$ is connected for biasing the transistors T1 and T2.

During operation, a current-limited oscillation is realized. In this mode, the current through transistors T1 and T2 fully switches from one side of the pair to the other, and vice versa, at a given resonance frequency $\omega_0$ resulting in a voltage signal being provided at drain or collector terminals of each transistor, which voltage signal has an oscillation frequency and oscillation amplitude. This resonance frequency $\omega_0$ is indirectly a function of the amount of water and the nutrient concentration, as it is dependent on values of $L_p$, $C_p$ and $G_p$. Changes of the resonance frequency as a result of adding water to substrate 1 can be measured directly, i.e., by determining the resonance frequency $\omega_0$ itself, or it can be determined indirectly. In this latter case, the oscillation frequency of the voltage signal is compared to an oscillation frequency of a reference signal, hereinafter referred to as reference frequency, using known techniques, such as, for example, a phase-locked loop (PLL), a frequency-locked loop (FLL), a direct digital synthesizer (DDS), or the like. For example, such circuit for determining the oscillation frequency $\omega_0$ of the voltage signal may be comprised in readout unit 6. The comparison signal resulting from the comparison of the resonance frequency to the reference frequency is then used for controlling the value of capacitor $C_t$ and/or inductor $L_t$ in the resonant tank. More in particular, in this embodiment, the values of capacitor $C_t$ and/or inductor L are controlled such that the resonance frequency becomes equal to the reference frequency, or to a desired frequency which can be a rational multiple of such a reference frequency. In this manner, a change in $C_t$ and/or $L_t$ reflects the difference between the original resonance frequency, i.e., before controlling $C_t$ and/or $L_t$, and the reference frequency itself.

The impedance seen by the cross-coupled transistor pair T1 and T2 is determined by the impedances of $L_t$, $C_t$, as well as the modelled values of $L_p$, $C_p$ and $G_p$, and can be written as an equivalent impedance having a real (resistive) part and an imaginary (reactive) part, each of which is a function of $L_t$, $C_t$, $L_p$, $C_p$ and/or $G_p$. The oscillation frequency $\omega_0$ of the voltage signal generated by the signal generation unit 5 is determined by a particular frequency, i.e. the resonance frequency, at which the reactive part of the impedance seen by the cross-coupled pair is roughly equal to zero. An equation that describes that the imaginary part of the combined impedance seen by the cross-coupled pair is equal to zero can be used as one of the equations that forms the system of equations used to determine the value of $L_p$, $C_p$ and $G_p$.

In addition, in the embodiment shown in FIG. 5, readout unit 6 can determine the oscillation amplitude of the voltage signal using known techniques, such as an envelope detector, a rectifying circuit, a root-mean-square (RMS) detector, or the like. At the resonance frequency, since the imaginary part of the combined impedance is equal to zero, the equivalent impedance seen by the transistor pair T1 and T2 is substantially purely resistive, which resistive part is also a function of $L_t$, $C_t$, $L_p$, $C_p$ and/or $G_p$. Moreover, since signal generation unit 5 comprises a current-limited oscillator, the oscillation amplitude of the voltage signal can be determined using the current provided by current source 8 and the resistance seen at the resonance frequency. Therefore, by determining the oscillation amplitude of the voltage signal, through Ohm's law, an equation is obtained that describes that a resistive part of the combined impedance of the resonant tank and the sensing elements 3A and 3B is equal to the oscillation amplitude of the voltage signal divided by a current provided by current source 8.

Consequently, the system of equations comprising an equation relating $C_p$ to $L_{p1}$ and/or $L_p2$ and the two equations described above can be uniquely solved by determining, using readout unit 6, the electrical parameters required to resolve all unknowns in said equations, except for $L_p$, $C_p$ and $G_p$. Following this, the system of equations can be solved to determine the value of $L_p$, $C_p$ and $G_p$, and, based on these values and the functions corresponding to these modelled impedances, the amount of water and nutrient concentration.

In the particular example provided above, two electrical parameters are required, namely the oscillation amplitude of the voltage signal and the controlled or known value of $L_t$ and/or $C_t$. Alternatively, $L_t$ and $C_t$ can both be fixed, that is, known or predetermined, and the electrical parameters that are determined by readout unit 6 comprise the oscillation amplitude of the voltage signal as well as the oscillation frequency of the voltage signal. Then, processing unit 7 can determine the amount of water and nutrient concentration based on the functions of $C_p(W, \varepsilon_s, \varepsilon_w)$ and $G_p(W, n)$.

It is noted that the above is merely an example of two equations which may form a solvable system of equations to determine $L_p$, $C_p$ and $G_p$. However, a person skilled in the art will appreciate that various other combinations of equations can be used, as long as these equations describe known or determinable electrical parameters in relation to at least one of $L_p$, $C_p$ and $G_p$.

In the above, the present invention has been explained using detailed embodiments thereof. However, it should be appreciated that the invention is not limited to these embodiments and that various modifications are possible without deviating from the scope of the present invention as defined by the appended claims.

The invention claimed is:

1. A sensing system for monitoring a substrate, comprising:
   a sensing unit comprising:
      a first and second sensing element configured to be inserted into the substrate; and
      a signal generation unit configured to apply an electrical signal to the first and second sensing elements;
   a readout unit configured to determine at least one electrical parameter as a result of the electrical signal being applied to the first and second sensing elements; and
   a processing unit configured to determine at least an amount of water inside the substrate among an amount of water in the substrate and a nutrient concentration in the substrate, based on the determined at least one electrical parameter and an electrical model of a combination of the first and second sensing element and the substrate in which they are inserted,
   wherein the electrical model comprises:
      a first inductor modelling a first inductance of the first sensing element and a second inductor modelling a second inductance of the second sensing element;
      a capacitor modelling a capacitance between the first and second sensing element; and
      a resistor modelling a conductance between the first and second sensing element;
      wherein the first inductance is modelled as a known first function of the amount of water inside the substrate, wherein the second inductance is modelled as a known second function of the amount of water inside the substrate, wherein the capacitance is modelled as a known third function of the amount of water inside the substrate, and wherein the conductance is modelled as a known fourth function of the amount of water inside the substrate and an amount of mobile ions representing the amount of nutrients inside the substrate.

2. The sensing system according to claim 1, wherein the value of the first inductor is substantially equal to the value of the second inductor.

3. The sensing system according to claim 1, wherein the readout unit is comprised in the sensing unit.

4. The sensing system according to claim 1, wherein the processing unit is comprised in the sensing unit.

5. The sensing system according to claim 1, further comprising a plurality of said sensing units for monitoring a plurality of respective substrates.

6. The sensing system according to claim 1, wherein the processing unit is configured to find a unique solution to a system of equations comprising a first equation, a second equation, and a third equation, wherein the first equation expresses the capacitance as a function of the first inductance and/or second inductance or vice versa, and wherein the second equation and the third equation each describe a relationship between one or more electrical parameters among the at least one electrical parameter, and the first inductance, the second inductance, the capacitance, and/or the conductance, wherein the processing unit is further configured to determine, using the unique solution, the amount of water inside the substrate based on:
- the determined value of the capacitance and the third function, and/or
- the determined value of the first and/or second inductance and the first and/or second function, respectively, and wherein the processing unit is optionally further configured to determine, using the unique solution, the nutrient concentration in the substrate based on the determined amount of water inside the substrate, the determined value of the conductance, and the fourth function.

7. The sensing system according to claim 6, wherein each of the first and second function are additionally a function of a density factor of the substrate, wherein the density factor is a substrate-dependent parameter that represents a distribution of the amount of water in said substrate, and
wherein the third function is additionally a function of a dielectric constant of water and a dielectric constant of the substrate.

8. The sensing system according to claim 7, wherein the dielectric constant of the substrate and the density factor of the substrate are known, or
wherein at least one of the dielectric constant of the substrate and the density factor of the substrate is determined using a calibration process comprising one or more calibration measurements.

9. The sensing system according to claim 7, further comprising a temperature sensor configured to determine a temperature inside or near the substrate, wherein the processing unit is configured to receive the determined temperature from the temperature sensor and to determine the dielectric constant of water based on the determined temperature, and to modify the third function in accordance with the determined dielectric constant of water,
wherein the temperature sensor is comprised in the sensing unit in or near one of the first and second sensing element.

10. The sensing system according to claim 8, wherein, for each calibration measurement, a known amount of water having a known nutrient concentration is provided in the substrate,
wherein the signal generation unit is configured to apply an electrical calibration signal to the first and second sensing element,
wherein the readout unit is configured to determine at least one electrical calibration parameter as a result of the electrical calibration signal being applied to the first and second sensing element, and
wherein the processing unit is configured to determine at least one of the dielectric constant of the substrate and the density factor of the substrate, based on the determined at least one electrical calibration parameter and the electrical model of the combination of the first and second sensing element and the substrate in which they are inserted.

11. The sensing system according to claim 10, wherein the processing unit is configured to find a unique solution to a system of equations comprising the first equation, a fourth equation, and a fifth equation,
wherein the fourth equation and the fifth equation each describe a relationship between one or more electrical calibration parameters among the at least one electrical calibration parameter, and the first inductance, the second inductance, the capacitance, and/or the conductance,
wherein the processing unit is further configured to determine the density factor of the substrate based on the determined value of the first inductance, and/or the second inductance and the first and/or second function, respectively, and/or
wherein the processing unit is further configured to determine the dielectric constant of the substrate based on the determined value of the capacitance and the third function.

12. The sensing system according to claim 10, wherein the calibration process comprises a plurality of calibration measurements for different amounts of water in the substrate,
wherein the processing unit is further configured to determine the dielectric constant of the substrate by matching the third function, using the dielectric constant of the substrate as a parameter, to the plurality of capacitance values corresponding to the plurality of calibration measurements, and/or
wherein the processing unit is further configured to determine the density factor of the substrate by matching the first and/or second function, using the density factor of the substrate, as a parameter to the plurality of first inductance values and/or second inductance values, respectively, corresponding to the plurality of calibration measurements.

13. The sensing system according to claim 1, wherein the signal generation unit comprises:
a transistor pair, wherein a gate or base terminal of each transistor in said transistor pair is electrically coupled to a drain or collector terminal of the other transistor in said transistor pair;
a resonant tank comprising a tank inductor and a tank capacitor which are coupled in parallel and electrically connected in between the drain or collector terminals of the transistor pair; and
a current source connected to a source or emitter terminal of each transistor,
wherein, in operation, the signal generation unit is configured to generate a voltage signal at the drain or collector terminals of the transistors, the voltage signal having an oscillation frequency and an oscillation amplitude.

14. The sensing system according to claim 13, wherein the oscillation frequency of the voltage signal lies in a range of 1-500 MHz.

15. The sensing system according to claim 13, wherein the second equation describes the oscillation amplitude as a function of a resistive part of a combined impedance of the resonant tank and the electrical model, and the current generated by the current source, wherein the current is either known or measured.

16. The sensing system according to claim 15, wherein the at least one electrical parameter and/or the at least one electrical calibration parameter comprises the oscillation amplitude.

17. The sensing system according to claim 13, wherein the third equation describes that a reactive part of the combined impedance of the resonant tank and the electrical model is equal to zero.

18. The sensing system according to claim 17, wherein the processing unit is configured to control a value of the tank inductor and/or the tank capacitor such that the oscillation frequency of the voltage signal becomes equal to a predefined frequency, and wherein an electrical parameter and/or electrical calibration parameter among of the at least one electrical parameter and/or at least one electrical calibration parameter comprises the controlled value of the tank inductor and/or the tank capacitor.

19. The sensing system according to claim 18, wherein the value of the tank inductor and/or the value of the tank capacitor is controlled based on a comparison between the oscillation frequency of the voltage signal, and an oscillation frequency of a reference signal.

20. The sensing system according to claim 17, wherein one of the at least one electrical parameter and/or at least one electrical calibration parameter comprises the oscillation frequency of the voltage signal.

* * * * *